United States Patent [19]

Stewart

[11] Patent Number: 4,886,187
[45] Date of Patent: Dec. 12, 1989

[54] PLASTIC CONTAINER WITH ENHANCED INSULATION

[75] Inventor: David R. Stewart, Richmond, Tex.

[73] Assignee: Shell Oil Company, Houston, Tex.

[21] Appl. No.: 244,214

[22] Filed: Sep. 14, 1988

[51] Int. Cl.$^4$ .............................................. B65D 21/00
[52] U.S. Cl. ...................................... 220/468; 220/469
[58] Field of Search ................ 220/469, 464, 468, 452

[56] References Cited

U.S. PATENT DOCUMENTS

| | | | |
|---|---|---|---|
| 1,993,730 | 3/1935 | Carpenter | 220/469 X |
| 4,420,670 | 12/1983 | Croswell et al. | 219/10.81 |
| 4,435,244 | 3/1984 | Beck et al. | 156/379.8 |
| 4,441,876 | 4/1984 | Marc | 425/174.8 |
| 4,448,345 | 5/1984 | Helms | 229/43 |
| 4,451,721 | 5/1984 | Nemeskeri | 219/10.43 |
| 4,512,942 | 4/1985 | Babbin et al. | 264/26 |
| 4,756,446 | 7/1988 | Gen et al. | 220/469 X |

Primary Examiner—John C. Fox

[57] ABSTRACT

A plastic container having enhanced insulation is made from a partially-laminated billet having a laminated outer periphery and gas trapped between the unlaminated portion of the billet layers, by heating the billet to a temperature below the softening point of at least one of the layers, which expands the gas trapped between the layers and separates the unlaminated layers. The billet is then clamped about its outer periphery and drawn into the shape of the container using solid-phase forming techniques. The separated layers insulate the contents of the container from the surrounding environment.

1 Claim, 6 Drawing Sheets

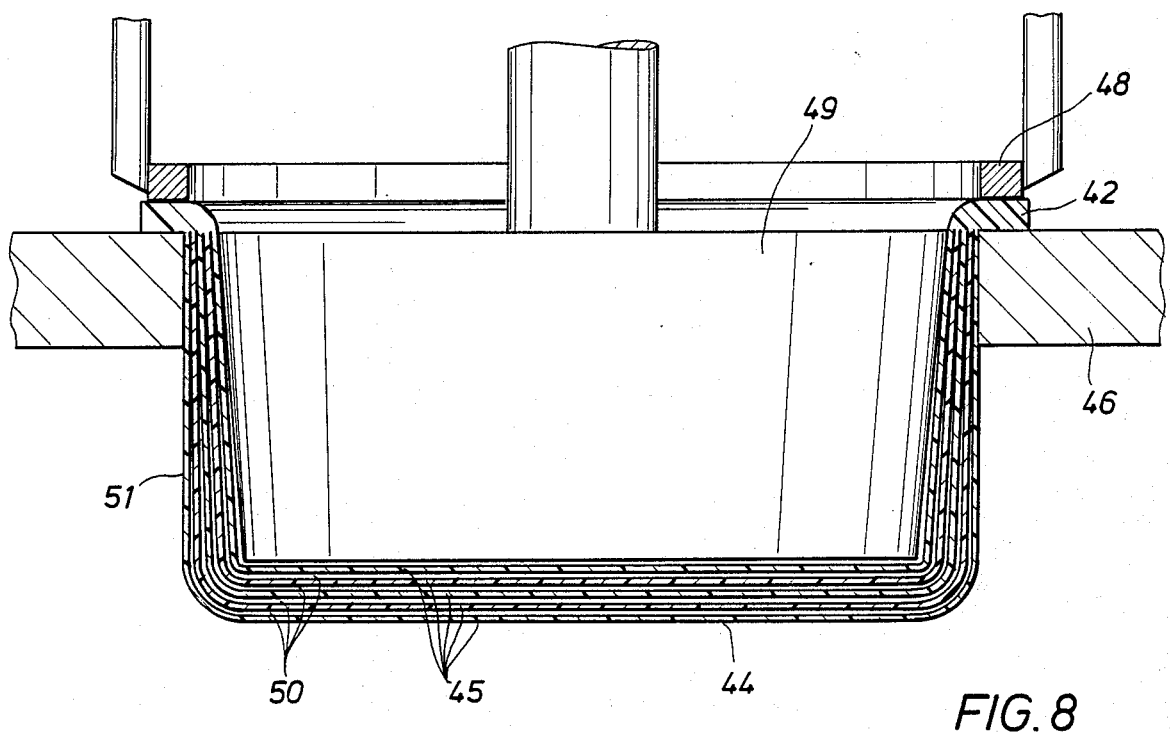
FIG. 8
FIG. 9A
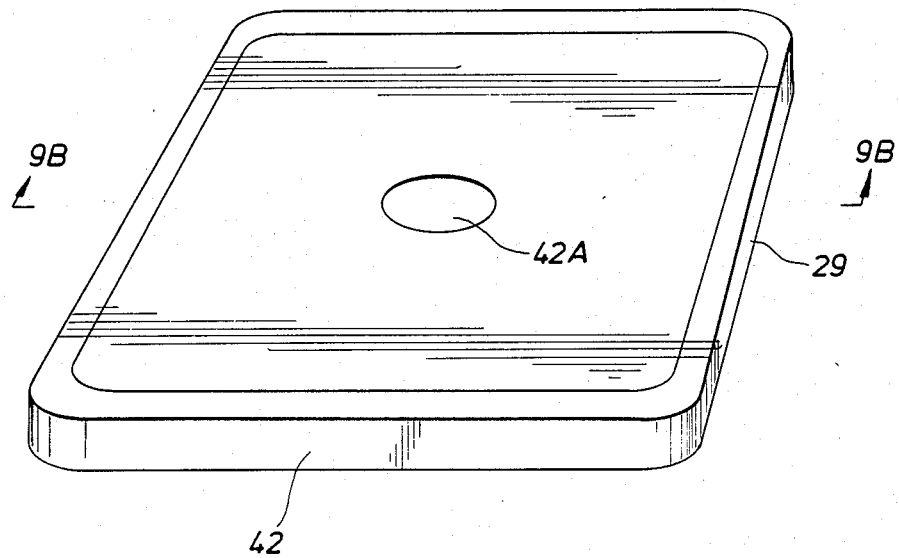

PLASTIC CONTAINER WITH ENHANCED INSULATION

RELATED APPLICATION

This application is related to an application entitled "Laminated Billet Process", filed Sept. 19, 1988, Mr. W. H. Korcz and Mr. R. L. Danforth inventors, Ser. No. 245,500.

BACKGROUND OF THE INVENTION

Plastic containers may be produced by thermoforming and solid phase forming laminated billets. The typical method for forming a laminated billet involves extruding a plurality of molten sheets, laminating the sheets together by passing them between rollers, and thereafter cutting or stamping the billets from the laminated sheets. The billets are subsequently thermoformed and/or solid phase formed to yield a container having a wall thickness roughly equivalent to or less than the total thickness of the sum of the thicknesses of the individual layers.

A container having this relatively thin wall thickness tends to transfer heat rapidly to or from the surrounding environment, and therefore is not much use when the user desires an insulated container.

Additionally, the process generates downstream of the billet formation point a laminated web, wherein all of the original layers of the plastic sheets are bonded together. Unless this web can be re-used effectively, the production of a laminated billet is made more expensive. Attempts are made to reintroduce the plastic from the web into the billet by either making a sheet from the mixed plastics of the web, or by mixing the plastics from the web into one of the layers. Neither one of these solutions is satisfactory because the sheets of mixed plastics or the blends of the mixed plastics with virgin material do not give the optimum properties nor do they process well.

It is possible to cool each of the sheets exiting the extruder below their softening point, cut individual billets from each sheet, then laminate the individual billets; but this requires handling a plurality of billets which, given the complexity of forming a laminate from a plurality of individual billets, has proven to be a costly manual handling problem.

Of course it should be well recognized that radio frequency radiation (about 01 to about 300 MHz) can be used to heat the billet layers. As used herein, dielectrically or radio frequency heatable thermoplastics are those having a loss index greater than about 0.8, more preferably greater than about 0.9 and most preferably greater than about 1.0 at the frequency of irradiation and these thermoplastics can be made to heat and melt when subject to an alternating radio frequency field. Furthermore, the nature of radio frequency heating allows one to be relatively selective about the geometry of heating. That is, one can localize the heating of a plastic to be essentially that volume of lossy material between the radio frequency electrodes.

If, for example, a laminate is to be made of a plurality of thermoplastic layers, at least one of which has a loss index equal to or greater than 0.8, and the thickness of the laminate, that distance perpendicular to the layers, is small compared with the distance parallel to the layers, one can melt the heatable layer with radio frequency radiation, and by conduction from the heatable layer cause any adjacent non-radio frequency heatable layers to melt. Assuming the adjacent layers are compatible, the layers will, with a small amount of pressure, form a laminate.

A insulated container need be developed that exhibits improved thermal insulation properties without an increase in the cost of fabrication. The process used to fabricate the container should eliminate the necessity of handling individual billets or a stack of loose individual billets. The process should also minimize the energy loss and maximize the polymer utilization when manufacturing the container from laminated billets.

SUMMARY OF THE INVENTION

An insulated container is made from a multi-layered partially-laminated plastic billet, wherein the outer edge or circumference of the billet has been laminated. The interior of the billet remains unlaminated with gas, (typically air), trapped between the layers.

The billet is then heated to a temperature below the softening temperature of at least one of the layers. The heating process causes the gas trapped between the layers to expand and to separate the layers. The outer edge of the billet is then clamped so as to hold it in place over an opening. The unclamped portion of the billet is then drawn into the shape of a container where at least some of the layers have a space between them caused by the expanded gas trapped between the layers. The space is larger than the space between the layers of the billet before the heating step.

The spaces between the layers form additional insulation layers between the environment and the interior of the container.

An advantage of the billet formation process is that the portion of the sheets that are not laminated together may be separated from each other and returned to the extruder without becoming contaminated by other material.

It is a feature of the invention to form an insulated container by use of partially-laminated billets.

It is an object of the invention to fabricate plastic containers with enhanced insulation by use of partially-laminated billets.

These and many other features and advantages of the present invention may become readily apparent, by reference to the following Figures and description of the invention.

IN THE DRAWINGS

FIGS. 3a, 3b, 3c, 3d, 3e; 4a, 4b, 4c, 4d, 4e and 5a, 5b, 5c, 5d, and 5e illustrate a close-up of the stack of sheets and the electrodes (series a), the stack of sheet and the cutting means (series b and c) and the cutout portion (series d and e).

Figure 6:
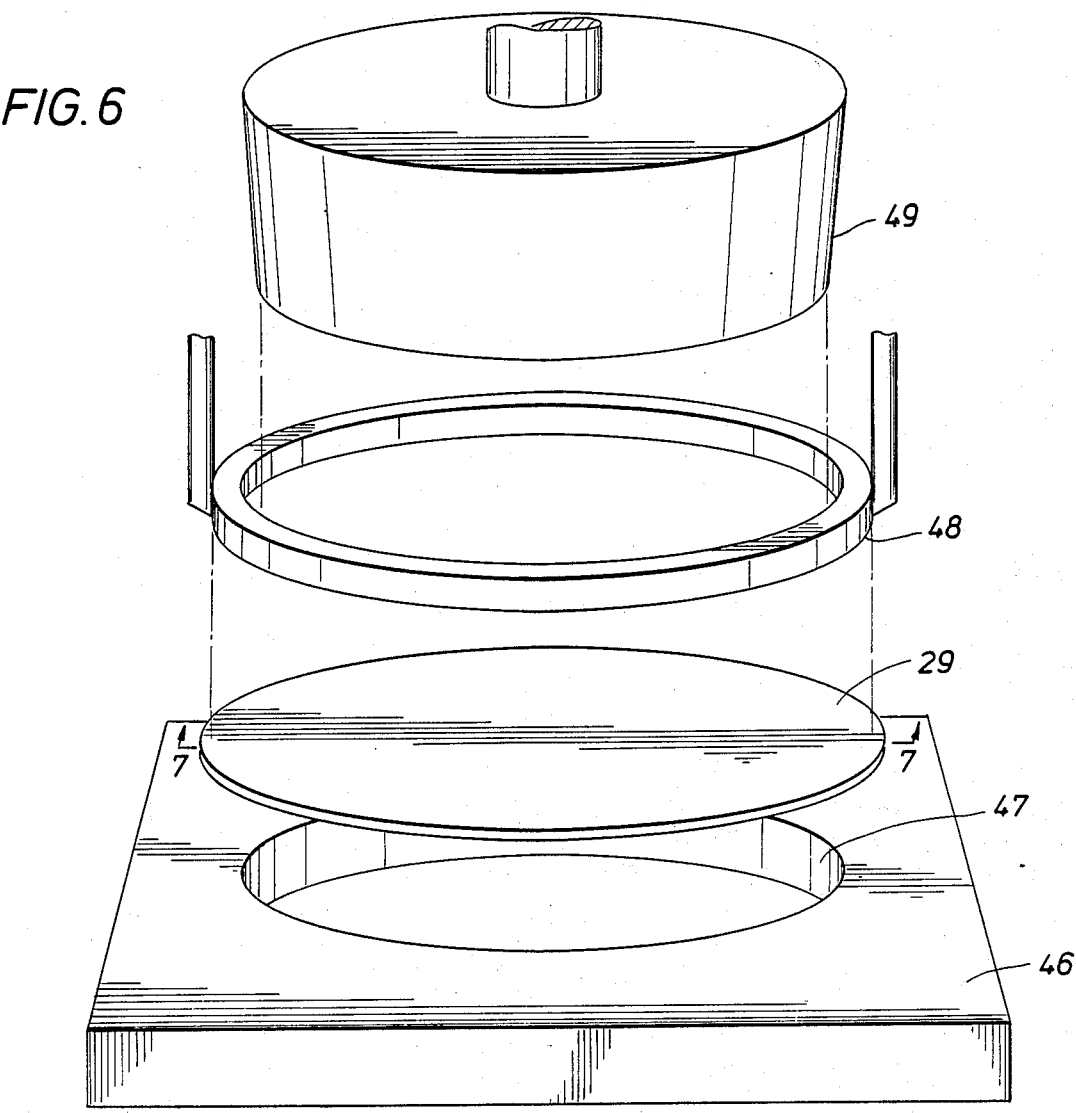

FIG. 6 shows a mold 46 having a hole 47 defined therethrough which is slightly smaller than the billet 29.

Figure 7:
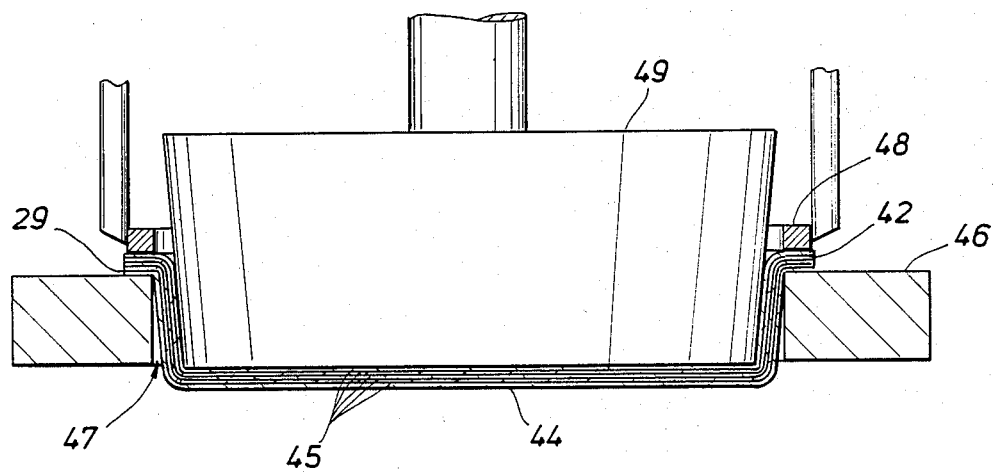

FIG. 7 is a partial view in cross section of the billet 29 of FIG. 6 bisected along lines 7—7 of FIG. 6 after the clamp 48 has clamped the billet 29 over the hole 47 and during the drawing step where the plug 49 is drawing the billet 29 through the hole 47.

FIG. 8 is a partial view in cross section wherein the plug 49 has reached the bottom of its stroke. The spaces 50 between the layers 45 in the unlaminated section 44 of the formed container 51 are shown.

Figure 9B:
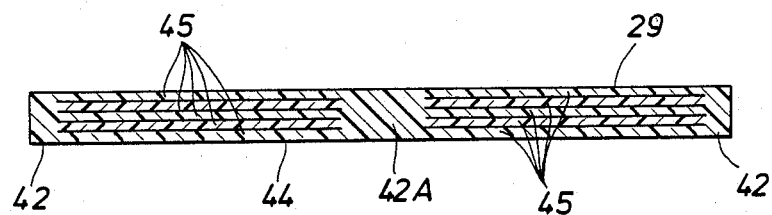

FIGS. 9a and 9b show a rectangular billet 29 wherein the circumference and a small area in the middle have been laminated using radio frequency to yield laminated areas 42, 42A and non-laminated area 44.

Figure 9C:
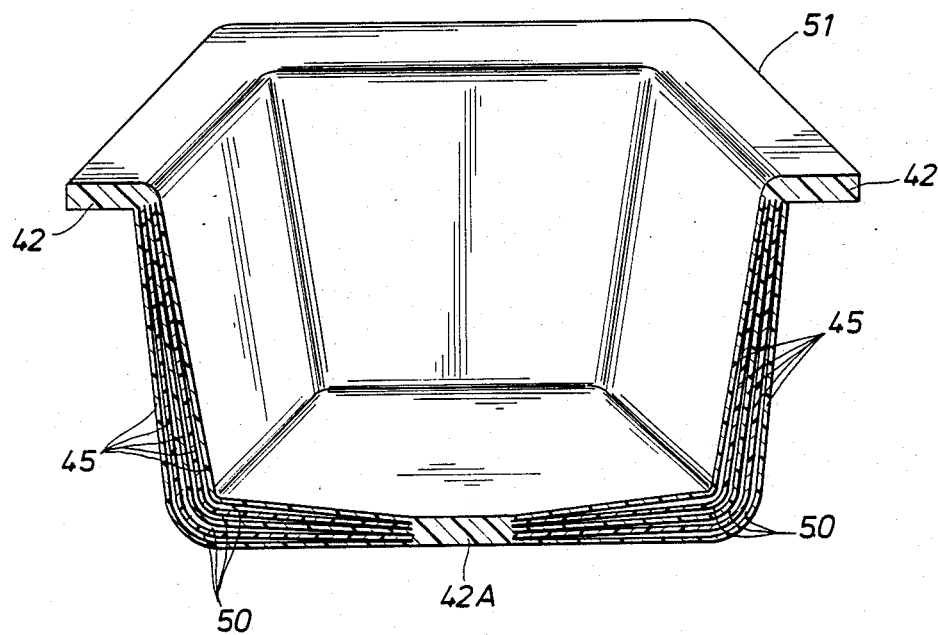

FIG. 9c is a solid-phase-formed container 51 made from the billet 29.

DESCRIPTION OF THE PREFERRED EMBODIMENTS

Figure 1:
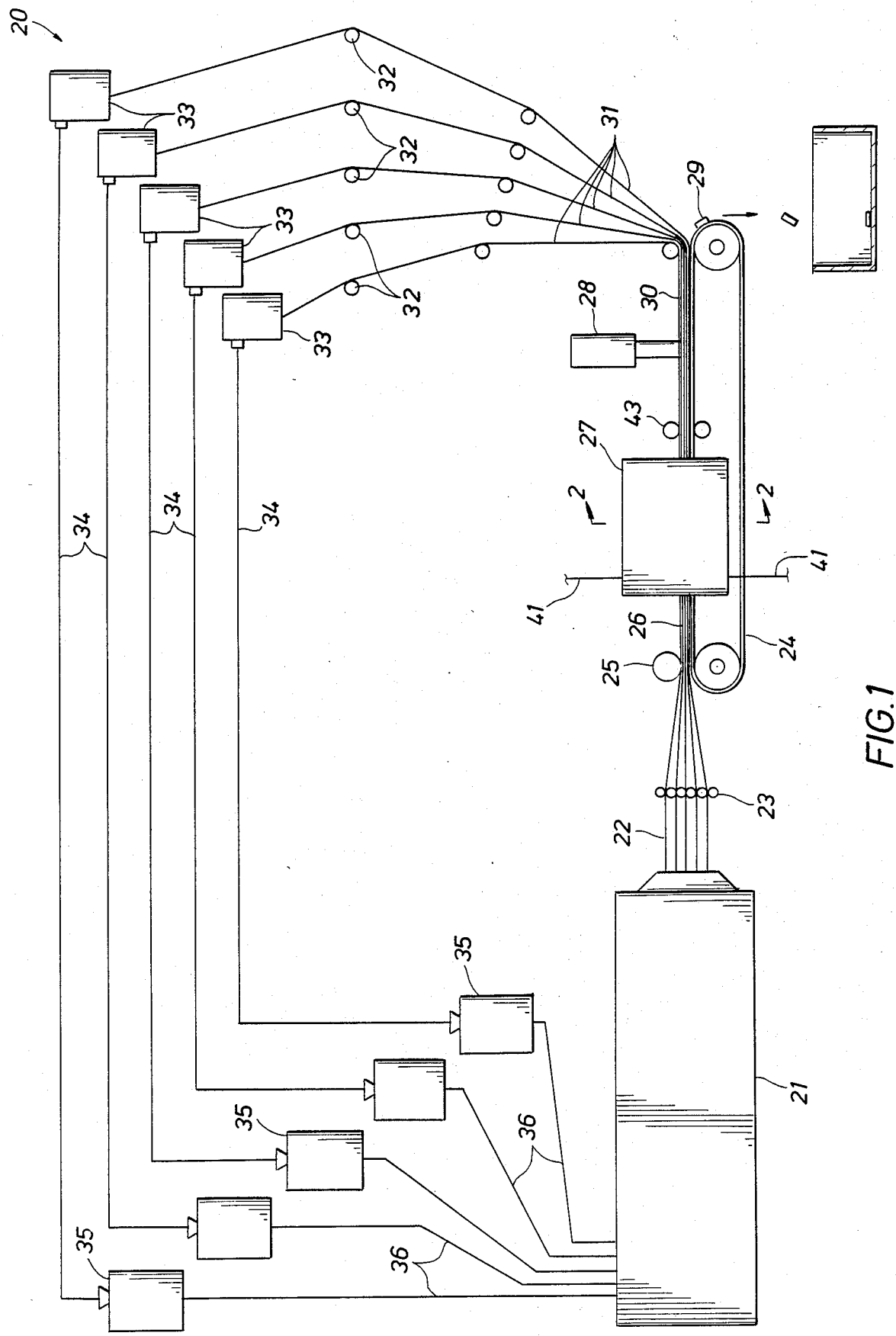
FIG. 1 is a schematic representation of the process of the present invention.

Referring now to FIG. 1 a continuous multisheet extruder 21 is shown which extrudes a plurality of sheets 22 (here five are shown but any number including 2 to about 15 can be used), at least one of which is made of a dielectrically heatable material. The sheets 22 are cooled below their softening points by sheet cooling means 23 (such as a series of chill rollers), stacked on a sheet conveyor means 24 (shown as a conveyor belt) by a sheet stacker means 25 (shown as a single roller). The stack of sheets 26 is passed through a radio frequency unit 27 having a plurality of paired electrodes 37 (shown in FIG. 2 described below) where at least a portion of each sheet is laminated or "tacked" to its adjacent sheet by subjecting the portion of the sheet to an alternating radio frequency field. The stack of sheets 26 with the tacked portions are moved under at least one stamp 28 which cuts out at least that portion of the stack of sheets 26 which are tacked together. The cutout portion 29 is separated from the stack of webs 30 and each web 31 is separated from the other webs 31 by a web separation means 32 (shown as a series of rollers) and each of the webs 31 is taken to a grinder 33 where it is ground. The pure, segregated, individual, uncontaminated regrind material is conveyed by regrind conveyors 34 to hopper blenders 35 where the regrind material is mixed with the original virgin polymer. The blend is then conveyed to the extruder 21 via a hopper/extruder conveyor 36, and the cycle repeated.

Figure 2:
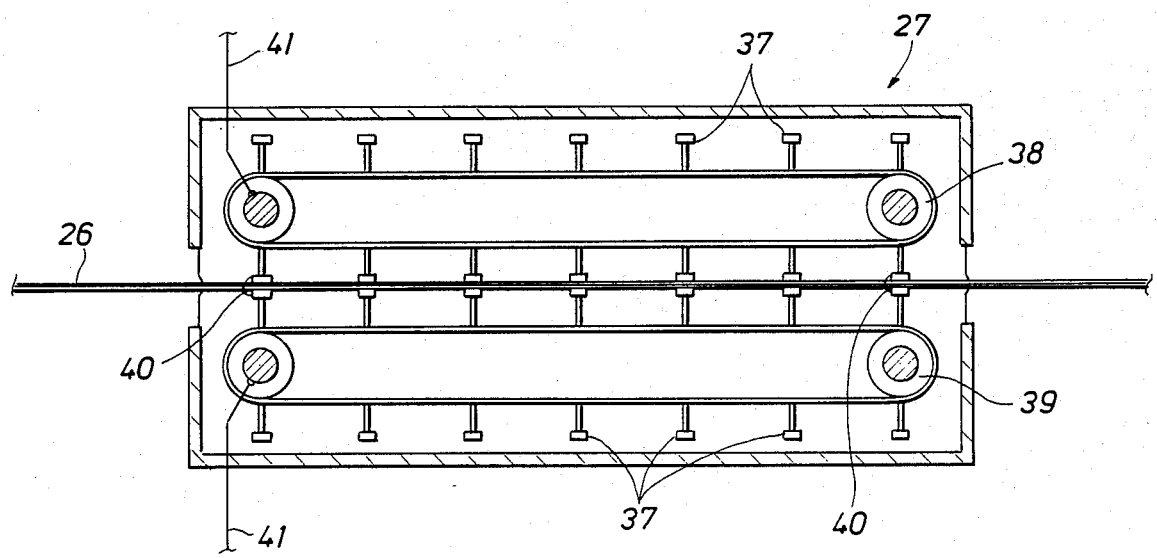
FIG. 2 is a schematic representation in partial cross section taken along lines 2—2 of FIG. 1 showing the movable radio frequency electrodes.

FIG. 2 is a cross section of the radio frequency unit 27 of FIG. 1 taken along the lines 2—2. A first electrode conveyor means 38, shown as a conveyor belt, having a plurality of electrodes 37 attached thereto and a second electrode conveyor means 39 having a plurality of electrodes 37 attached thereto are indexed so that a pair of electrodes 40, one on either side of the stack of sheets 26, move along at the same speed as the stack of sheets 26. Each of the electrode conveyor means are connected to a radio frequency field source (not shown) via connection 41. The sheet conveyor means 24 (FIG. 1) should be made of a non-lossy material or it may have holes therein indexed so that the electrodes 37 may contact the sheet. In an alternate embodiment the sheet conveyor means 24 are a series of rollers on either side of the radio frequency unit 27. It is preferred that at least one of the electrodes 37 be spring loaded so as to exert pressure on the stack of sheets 26.

It is also possible to continuously extrude a stack of sheets 26, cut the stack of sheets 26 into a convenient length and feed these cut stacks into a radio frequency unit where parts of the stack of sheets are laminated and then a part of the sheet equal to or larger than the laminated part is cut out of the stack of sheets 26 to leave a stack of webs 30.

FIGS. 3a, 3b, 3c, 3d, 3e; 4a, 4b, 4c, 4d, 4e and 5a, 5b, 5c, 5d, and 5e illustrate a close-up of the stack of sheets and the electrodes (series a), the stack of sheet and the cutting means (series b and c) and the cutout portion (series d and e), as described more fully below.

Figure 5A:
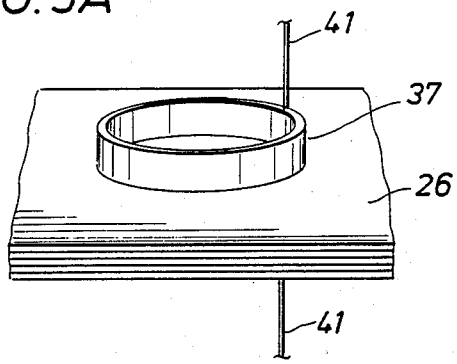
Figure 3A:
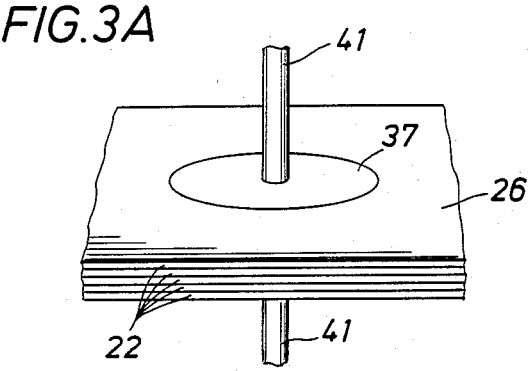
Figure 4A:
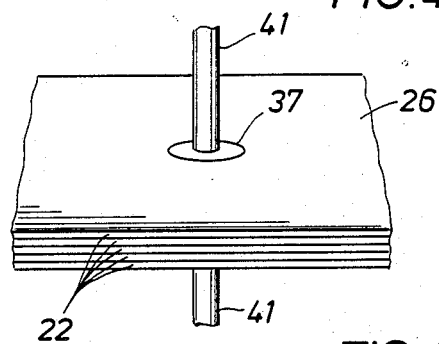

FIGS. 3a, 4a and 5a show a stack of sheets 26 (five sheets 22), a first electrode 37 (the second electrode is obscured by the sheet but its shape and position match the first electrode) connected to the field source 41.

Figure 5B:
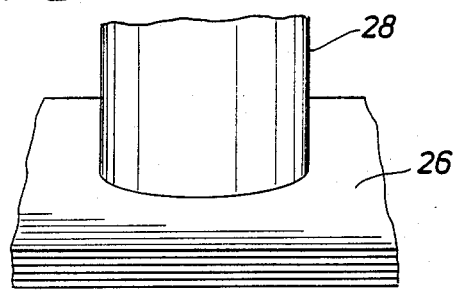
Figure 3B:
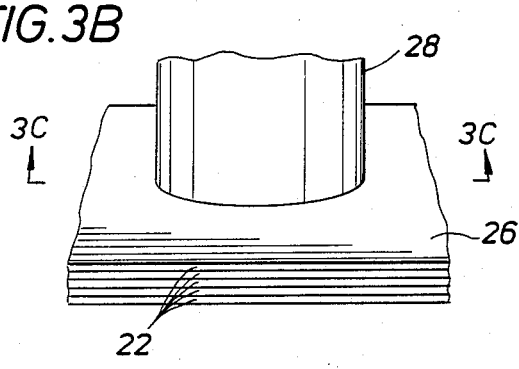
Figure 4B:
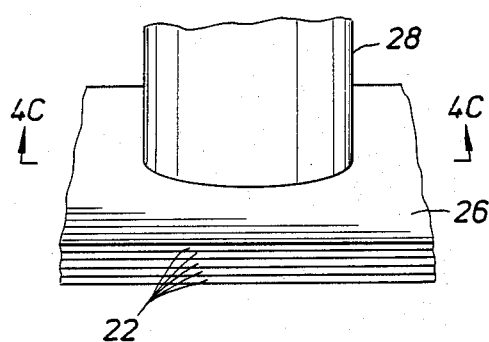

FIGS. 3b, 4b and 5b show the cutter means 28 about to stamp out a portion of the stack of sheets.

Figure 5C:
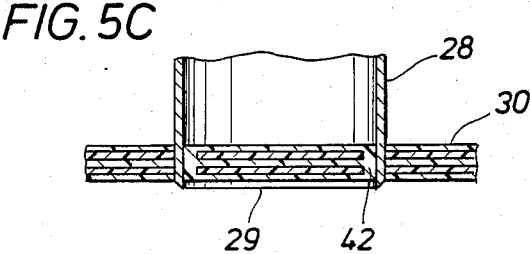
Figure 3C:
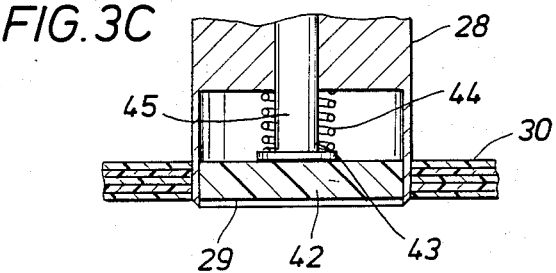
Figure 4C:
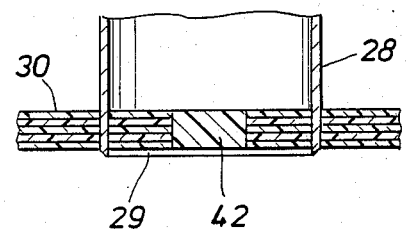

FIGS. 3c, 4c and 5c is a partial side view in cross section of the cutter means 28 and the stack of sheets 22 as the cutter means 28 finishes its cut. These Figures illustrate the portion of the sheet tacked or laminated together 42, that portion that will be a stack of webs 30 and the cutout portion 29. FIG. 3c shows an optional cutout ejector means 43 which is a spring 44 loaded pin 45 used to eject the cutout portion 29 when the cutout means 28 is withdrawn.

Figure 5D:
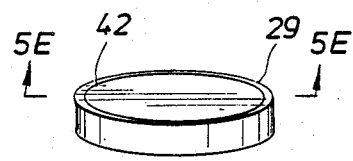
Figure 3D:
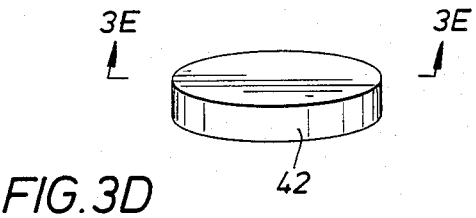
Figure 4D:
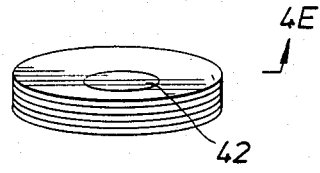

FIGS. 3d, 4d and 5d are three dimensional views of the cutout portion 29 showing the tacked portion 42 where appropriate.

Figure 5E:
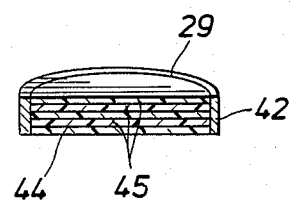
Figure 3E:
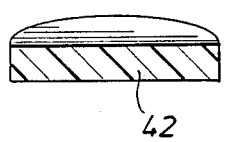
Figure 4E:
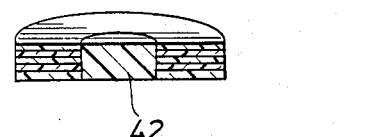

FIGS. 3e, 4e and 5e are partial side views in cross section of the cutout portion 29 of FIGS. 3d, 4d and 5d cut along the lines 3e—3e, 4e—4e, and 5e—5e respectively. These views show cross sections of the cutout portion, illustrating what portion 42 has been laminated. The electrodes 37 and the cutter means may be any shape, curvilinear or polyhedral or a combination thereof and therefore the cutout potion 29 and the tacked portion 42 may be any shape, provided the shape and size of the cutter means 28 removes essentially all of the tacked portion 42 from the sheets 22 so the webs 30 are free to separate. Where the outer portion of the tacked portion 42 and the cutter means 28 are of the same dimensions, it may be necessary to experiment with the size of the electrode and the rate of heating in order to account for a small amount of heating by conduction outside of the area of the electrode pair 41.

It is preferred that the radio frequency heatable sheet or sheets 22 be one of the interior sheets. If the outside sheets in a stack of sheets are nonheatable sheets, i.e. sheets with a loss index of 0.07 or less at the frequency being used, then it will be possible to laminate or tack without melting the outside surface of the outside sheets. When the outside sheets are melted in the laminating step of the process or when the thickness of the melted portion of a stack of sheets is large compared to the unmelted portion, the tacked stack of sheets 26 should be cooled before stamping out the cutout portion 29. This can be accomplished by either increasing the time/distance between the radio frequency unit 27 and the stamping operation 28 allowing ambient air to cool the stack 26 or by running the tacked stack of sheets 26 through a cooling means 43 (see FIG. 1) such as chilled rollers.

The preferred radio frequency applied by the electrodes to portions of the sheets is between about 0.1 to about 300 MHz, the most preferred frequency is between about 0.1 to about 200 MHz. The frequency or frequencies used, the field strength and the time of heating will depend on the type, number and thickness of the radio frequency heatable and nonheatable thermoplastic sheet or sheets in the stack, the geometry of the electrode pair and the insulation and heat loss factors within the radio frequency unit. Some experimentation will be necessary to determine the optimum conditions for each new stack of sheets and/or electrode geometry. Radio frequency heating of resins is a well known art and factors influencing the heating are detailed in Plastic Fabrication by Ultraviolet Infrared, Induction, Dielectric and Microwave Radiation Methods by Arthur F. Readdy, Jr., published April 1972 as Plastic Report R43 by the Plastics Technical Evaluation Center, Picatinny Arsenal, Dover, N.J. 07801, as well as in other references.

When less than all of the cutout 29 is laminated, i.e. as in FIG. 4e or 5e and it is desirable to have all of the cutout laminated, as in FIG. 3e, the cutout portion 29 may be post laminated, i.e. subjected to an additional heating step (conduction, convection or dielectric) whereby at least all of the inner surfaces of the unlaminated portions are melted and a small amount of pressure applied to complete the lamination step of the entire cutout.

The pressure needed in the tacking step in the unit 27 or in the post-laminating step is small and can be as small as about 1 psi but is preferably between about 1 to about 100 psi. Higher pressure can be used but is not normally needed.

The cutouts may be used as billets in thermoforming, solid phase forming, blow molding or vacuum molding processes. One of the billets made by this process is especially useful in making the apparatus of the present invention which comprises containers having enhanced insulation qualities. The billet shown in FIG. 5e has its circumference laminated 42 and the remaining unlaminated portion 44 of the billet unlaminated. A small amount of gas (air) is trapped between each billet layer 45 of the unlaminated portion 44.

This circumference-tacked billet may also be made by stacking a plurality of billets in a mold where at least one of the billets is radio frequency treatable and tacking the circumference of the billets together by subjecting substantially only the circumference to radio frequency radiation and applying pressure, preferably only to the circumference.

Once a billet has been made that has its circumference laminated and the interior not laminated, so as to form a pressure seal from the interior to the exterior of the billet layers, the whole billet may be heated to a temperature below at least the highest melting thermoplastic. The circumference is then clamped and the billet drawn into the shape of a container. The gas expands when the billet is heated resulting in a space between the layers 45 in the unlaminated portion of the formed container.

In such a preferred manner an insulated container may be formed by solid-phase formation of the billet at a temperature lower than the lowest melting temperature of any layer 45. Adequate room must be allowed for expansion in the female mold used to form the container. Maximum separation between the layers 45 gives the maximum amount of insulation. The method is illustrated in FIGS. 6, 7 and 8 using a plug-assisted solid-phase-forming process, as follows:

Referring now to FIG. 6 a mold 46 is shown having a hole 47 defined therethrough which is slightly smaller than the billet 29. The billet 29 is heated about it's outer periphery, (or circumference in the case of a billet having a circular edge), to a temperature just below the melting point of its lowest melting plastic, placed over the hole 47 and a clamp 48 used to secure the outer periphery of the billet to the mold 46. A plug 49 pushes the billet and draws the billet into the form of a container.

FIG. 7 is a three-dimensional cross section of the billet 29 of FIG. 6 bisected along lines 7—7 of FIG. 6 after the clamp 48 has clamped the billet 29 over the hole 47 and during the drawing step where the plug 49 is drawing the billet 29 through the hole 47. This view shows the clamped laminated section 42 of the billet 29 and the layers 45 of the unlaminated section 44.

FIG. 8 is a view of FIG. 7 where the plug 49 has reached bottom. This view has been exaggerated to show the spaces 50 between the layers 45 in the unlaminated section 44 of the formed container 51.

Solid-phase forming is a known body of art and any one of this family of processes can be used, provided space in the mold is provided to allow the spaces 50 to form.

A preferred solid-phase forming process would be the use of vacuum to draw the clamped billet 29 into a cavity. A more preferred process would be to simultaneously draw the billet into a cavity with vacuum and plug assist the formation of the container with a plug 49. Space between the cavity walls and the plug must be provided to enable the spaces to form.

Solid phase forming is necessary to avoid further lamination of the layers 45. If, for example, in a billet having a sequence of layers 45 of polypropylene, a polypropylene/maleic anhydride graft copolymer (tie layer), a polyvinyl alcohol/ethylene copolymer (PVA), a polypropylene/maleic anhydride graft copolymer, polypropylene was heated to a temperature during solid phase forming which would melt the propylene-containing polymers but not the PVA, some lamination of the layers would occur but a space would form between the PVA layer and its adjacent layers. If the solid phase forming had been done at a temperature below that at which all of the layers would melt, no additional lamination would take place and a space would be formed between all of the layers.

It is the trapped expanding hot gases which form the spaces 50. Once the container is cooled, it leaves a partial vacuum in the spaces 50. Over time, depending on the nature of the layers 45, gas will diffuse from the surroundings to equalize the pressure. Whether a partial vacuum or gas filled, the space adds to the insulation quality of the walls of the container.

The billet in FIG. 5e is shown with only the edges of its outer periphery laminated. The billet need not be round and other small parts of the billet can be laminated, for example FIGS. 9a, 9b and 9c show such a billet 29 and container 51.

FIGS. 9a and 9b shows a rectangular billet 29 where the outer periphery and a small area in the middle have been laminated using radio frequency to yield laminated areas 42, 42A and non-laminated areas 44. FIG. 9b shows the billets of 9a cut along lines 9b—9b of FIG. 9A showing the interior part of the billet 29 with its laminated areas 42, 42A and layered 45 non-laminated areas 44.

FIG. 9c is a solid-phase-formed container 51 made from the billet 29 which shows the spaces 50 (exaggerated).

The spaces 50 begin to form when the billet is heated. This is especially true when the temperature of the billet is above the softening point of some of the layers and below the softening point of the remaining layers. Further, space 50 formation occurs during the drawing step because the thickness and therefore the strength of the layers is dramatically reduced during drawing and the resistance of the layers is decreased to the internal gaseous pressure created by the heating of the gases trapped between the layers. It is also possible to heat cycle the billet to increase the space 50. That is, heat the billet to get some expansion, cool and allow the air (gas) to diffuse into the space 50 thus created, then reheat to increase the pressure again. The heating step may take place before or after the clamping step. Drawing the billet into the shape of a container can be done in an opening with or without a bottom and the drawing step can be accomplished by the use of a vacuum, with a mandrel, plunger or plug or with the assistance of both.

A partially-laminated billet 29 may be heated to at least 60° C., more preferably at least 80° C., even more preferably about 1° to about 10° C. below the softening point of at least one of the layers of the billet and more preferably between about 1° and about 10° C. below the lowest softening point of any layer making up the partially laminated billet.

The preferred billets are made from non-dielectrically heatable thermoplastic sheets of polyolefins such as polypropylene, polyethylene, polybutene and these copolymers, appropriate tie layers and dielectrically heatable polymer thermoplastics such as polyvinylalcohol, polyvinylidene chloride, polyvinylchloride, nylons, and ethylene copolymers. The preferred sequence of layers would be one where a dielectrically heatable thermoplastic is an inner layer. A more preferred sequence is where each non-dielectrically heatable layer is separated by a dielectrically heatable layer. The most preferred sequence is where the outside layers are non-dielectrically heatable thermoplastics. A particularly most preferred sequence is one in which the tie layers are dielectrically heatable thermoplastics.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim as our invention:

1. An insulated container having a shaped opening defined downwardly therein, said container comprising a plurality of shaped adjacent layers simultaneously warped from an initially planar orientation, the layer adjacent said opening strain hardened less than the adjacent layer, each successive layer strain hardened more than the adjacent layer located in a direction toward said shaped opening, wherein the outer edge of each of the adjacent layers has been commonly laminated to at least one adjacent layer, and wherein at least one of said layers is dielectrically heatable, and at least one of said layer is dielectrically non-heatable.

* * * * *